United States Patent [19]

Nemit et al.

[11] 4,197,541
[45] Apr. 8, 1980

[54] POLARIZATION AGILE PLANAR ARRAY

[75] Inventors: Jeffrey T. Nemit, Canoga Park; Thomas W. Lawson, Jr., Northridge, both of Calif.

[73] Assignee: International Telephone and Telegraph Corporation, New York, N.Y.

[21] Appl. No.: 861,903

[22] Filed: Dec. 19, 1977

[51] Int. Cl.² .............................................. H04B 7/00
[52] U.S. Cl. ............................. 343/100 PE; 343/771
[58] Field of Search ................ 343/100 PE, 756, 771; 333/21 A

[56] References Cited

U.S. PATENT DOCUMENTS

| | | | |
|---|---|---|---|
| 3,135,959 | 6/1964 | Moran | 343/771 |
| 3,286,260 | 11/1966 | Howard | 343/771 |
| 3,526,898 | 9/1970 | Plunk et al. | 343/771 |
| 3,560,975 | 2/1971 | Manuali | 343/100 PE |
| 3,701,162 | 10/1972 | Seaton | 343/100 PE |
| 3,716,856 | 2/1973 | Beguin | 343/6.8 LC |
| 3,810,186 | 5/1974 | Nakahara et al. | 343/771 |

OTHER PUBLICATIONS

Ferris, Joseph E. *Study of Polarization Modulation Techniques*, p. 76, Melpar Inc.

Primary Examiner—Theodore M. Blum
Attorney, Agent, or Firm—William T. O'Neil

[57] ABSTRACT

A planar array and associated apparatus providing polarization agility in radar systems. The array is composed of first and second pluralities of generally parallel, slot-radiator, linear arrays. The first group of linear arrays has radiator slots oriented at 45° with respect to the axial (lengthwise) dimension of the linear arrays. The second group also has 45° slots, but they are rotated 90° with respect to the slots of the first group. First and second groups are interleaved, each group being excited in parallel, the first group directly from a transmit/receive port and the second from the same port but through a controllable phase shifter. The setting of the phase shifters of the array comprising the first and second groups of interleaved linear arrays produces a corresponding operating polarization. Each linear array is a length of coaxial transmission line with rectangular or square outer conductor, the slots being cut into the walls thereof. An alternative instrumentation includes an attenuator for charging the relative excitation amplitude between first and second linear array groups and provides elliptical polarization.

9 Claims, 6 Drawing Figures

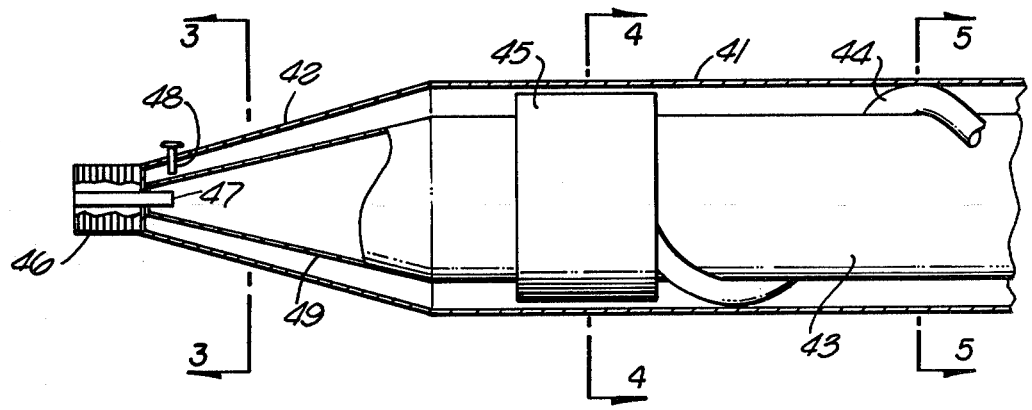
FIG. 2
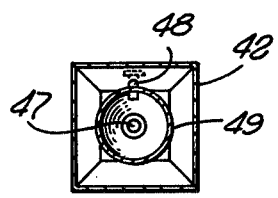
FIG 3
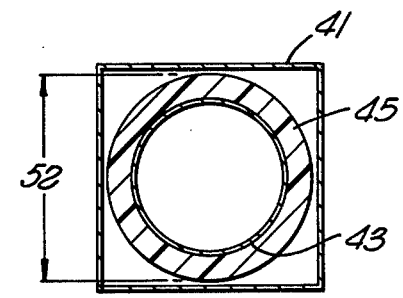
FIG 4
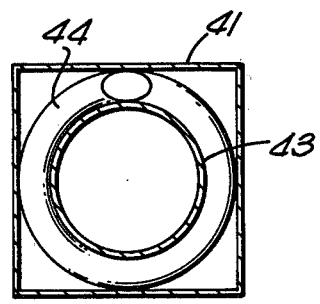
FIG 5
FIG 6

POLARIZATION AGILE PLANAR ARRAY

BACKGROUND OF THE INVENTION

The invention relates to radar systems generally but more particularly to planar array, directive radiating and receiving systems in which the plane of polarization of transmitted or received RF energy may be electronically controlled in a substantially inertialess manner.

In the prior art, polarization-agile radar systems are known, per se, in various forms. The use of gratings and lenses in the near field of a radar array are well-known expedients for twisting or rotating a plane of polarization; however, such electromechanical apparatus is not generally regarded as qualifying for polarization agility. Rather, electronically controllable means of the substantially inertialess type are commonly involved in truly agile polarization systems. Since they are often combined with frequency or phase scanning arrangements, it is particularly necessary and important that polarization changes be relatively rapidly accomplished for a number of reasons well understood in the art.

Planar array antennas have come into use in radar systems, because they have advantages of higher gain and lower sidelobes compared with optically fed antennas of conventional design and, moreover, are particularly adaptable to frequency or phase types of inertialess scanning.

Arrays of physical dipoles have been employed in planar arrays involving corporate feeds and slow-wave structures to increase the change of beam pointing angle as a function of frequency or phase change (scan sensitivity).

The prior art in planar and phased arrays is discussed in the text, RADAR HANDBOOK, by Merill I. Skolnick (McGraw-Hill Book Company, 1970), particularly, in Chapter 13, Section 13.3, and in Chapter 11.

The general concept of converting a relative phase shift in energization between first and second interleaved groups of discrete dipole linear arrays forming a planar array in order to produce polarization agility is known; however, it is difficult and even at times impossible to control the interaction among physical dipoles in a planar array. Slotted waveguide arrays, although used in frequency and phase scanned arrays, are not suitable for the application of the differential phase shift concept to produce polarization agility or controllability, because the electrical wavelength within a waveguide is relatively long, causing the radiating slots to be relatively widely spaced, giving rise to grating lobes, unless dielectric loading is employed to decrease the effective physical wavelength. In a waveguide arrangement, such an expedient would be expensive and heavy.

The manner in which the present invention solves the problems of the prior art and addresses the needs for inexpensive and efficient polarization agility in a planar (pencil beam forming) array will be evident as this description proceeds.

SUMMARY

In accordance with the aforementioned state of the prior art, it may be said to have been the general objective of the present invention to produce a polarization-agile planar array with relatively simple and inexpensive structure.

According to the invention, the planar array is comprised of a plurality of individual linear arrays arranged in a generally parallel configuration. The linear arrays are divided into two sets of interleaving linear arrays, such that alternate ones of the planar array belong in first and second sets, respectively. In this way, the sets can be fed independently with their individual linear arrays being fed generally in parallel.

Each linear array comprises a plurality of 45° slots in a face of a rectangular (square) outer conductor, circular inner conductor, coaxial transmission line. Linear arrays of one set have their radiating slots oriented in the same sense, whereas those of the other set are also 45° with respect to the length dimension of the linear arrays (axial dimension) but are orthogonally positioned (rotated 90°) with respect to the slots of the first set.

Means are included to excite the linear arrays of one set directly and to excite the other set through a controllable phase-shifting arrangement, the net operating polarization of the planar array being controllable as a function of the phase shift introduced by the aforementioned phase shifter. Alternatively, apparatus for controlling the relative amplitude of energy in the two linear array sets as units can produce elliptical polarization of various aspect ratios.

The device is reciprocal and will be described more fully as to structural and operational details as this description proceeds.

BRIEF DESCRIPTION OF THE DRAWINGS

FIG. 2 is a cut-away pictorial showing the details of individual linear array construction.

FIGS. 3, 4 and 5 are sectional views taken through FIG. 2, as indicated.

FIG. 6 is a partial schematic block diagram illustrating the modifications to FIG. 1 to obtain elliptical polarization.

DETAILED DESCRIPTION

Figure 1:
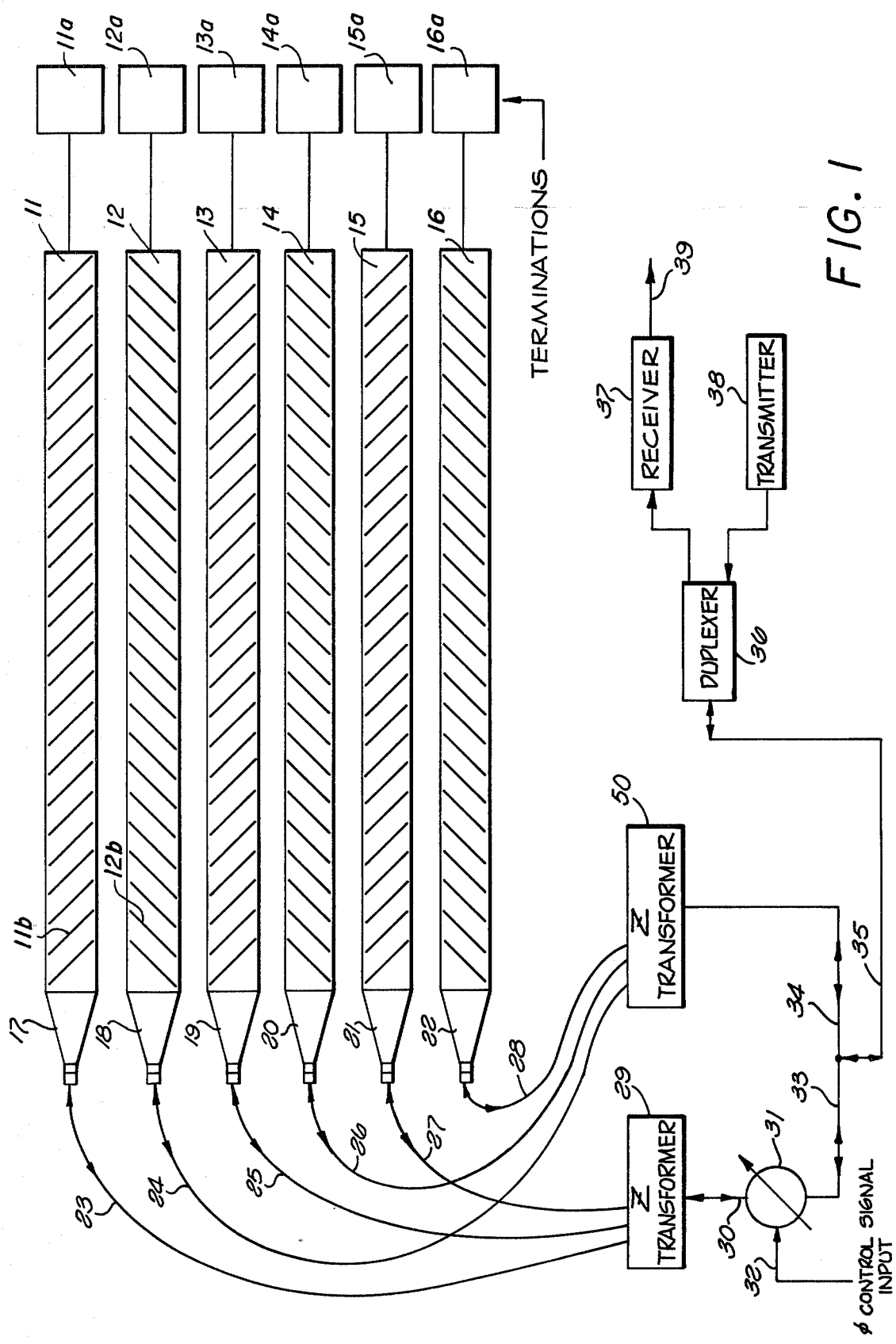
FIG. 1 is a schematic diagram of a transmit/receive system employing the polarization-agile array concept of the invention.

Referring now to FIG. 1, a planar array 10 is shown comprising six linear, slot-radiator arrays 11, 12, 13, 14, 15 and 16. The selection of six linear arrays for illustration is not to be taken as any indication of the optimum number of such arrays in a planar array according to the invention. Engineering considerations dictate the choice in that matter, including the characteristics of the pencil beam directivity desired of the planar array.

Each of the arrays 11–16 is fed by a corresponding feed line 23, 24, 25, 26, 27 or 28, respectively. These feed lines may be ordinary, well-known, flexible, coaxial cable, as appropriate in the frequency band of interest, and may be of nominal impedance of 50 ohms, for example. Each of the aforementioned feed lines to its corresponding linear array couples thereto through a corresponding transition section 17, 18, 19, 20, 21 or 22, as illustrated in FIG. 1. Similar, impedance-matching terminations 11a, 12a, 13a, 14a, 15a and 16a are connected to the linear arrays individually, as also illustrated. Thus, each of the individual arrays 11–16 is, in itself, a "leaky" transmission line fed from one end and provided with a resistive termination at the other end.

Before further description of the elements of FIG. 1, the details of the construction of the identical linear arrays 11–16 with their transition sections 17–22, respectively, will be described referring to FIGS. 2–5.

In FIG. 2, the outer conductor 41 of a rectangular square coaxial line comprising the body of each linear array has a center conductor 43 of circular cross-section supported therein by means of a spiralled rod of dielectric material 44. In addition to providing a mechanical support for centering the center conductor 43 within 41, the dielectric spiral 44 also acts as uniform line dielectric loading in order that the spacing of the slot radiators, such as 11b and 12b illustrated typically on FIG. 1, may be kept relatively small. The function of dielectric loading of transmission lines in general, in order to modify the effective wavelength therein, is known. This is a matter affecting the overall length of the line and spacing of radiators, vis-a-vis, a set of given requirements in respect to radiation pattern characteristics.

A dielectric sleeve 45 surrounds and is in contact with the inner conductor 43 but does not touch the inside wall of the square outer conductor 41. This sleeve provides an impedance matching section, its axial length and outside diameter being variables subject to a specific design. In general, the axial length dimension 51 is adjusted so that its electrical length is substantially a quarter wavelength within the coaxial transmission line of which 41 is the square outer conductor. The diameter 52 of dielectric matching section 45 interrelates to impedance as does the dielectric constant of the material of which it is made. As hereinbefore indicated, the drive cables (23 through 28) are assumed to be standard 50 ohms coaxial cable, whereas the characteristic impedance of the coaxial line represented by 41 and 43 may be on the order of 57 ohms or higher. Accordingly, the dielectric impedance matching sleeve 45 may be designed according to techniques and criteria well understood in this art to provide a characteristic impedance of its own which is the geometric mean of the input 50 ohms and the square coaxial line nominal impedance on the order of 57 ohms (typically).

FIG. 4 indicates a cross-sectional view for a better understanding of the nature of the dielectric sleeve 45.

The cross-section of FIG. 5 is to be understood to be typical of the square coaxial line from the dielectric sleeve 45 to the termination end thereof for each of the linear arrays of FIG. 1.

Typical materials for providing the dielectric loading are known to those skilled in this art, polytetrafluoroethylene (commonly known as teflon) being one such material.

The terminations 11a through 16a are ordinary resistive terminations included for the well understood reason, namely for the prevention of reflections back down the line. These terminations can be constructed in accordance with standard techniques suitable for terminating a square coaxial line.

Continuing with FIG. 2, it will be noted that the feed end of outer conductor 41 comprises a pyramidal section 42, and the center conductor 43 involves a conical section 49 in order to accommodate the interface between standard 50 ohm input cables and the square coaxial line itself.

FIG. 3 indicates the shapes of those parts in accordance with a section taken through the aforementioned pyramidal portion 42, looking towards the feed-end standard coaxial connector 46 as indicated. The tapered inner conductor 49 is illustrated as though it were itself a hollow tubular member, which it preferably is, although the use of solid bar for 43 extending into 49 is not precluded. In FIG. 3, it will be noted that the section 49 tapers down to 47, fitting within in the small end of the hollow pyramidal section 42. The inner tip of the coaxial connector 46 and 47 would normally just fit within the small end of 49 as illustrated.

The conductive post 48 might be mounted, for example, in a threaded bushing to the wall of 42 at the point indicated, and might itself be a threaded part so its position could be adjusted with respect to the junction at 53. Due to the imperfect geometry at the junction of 53 (i.e., the matching of square cross-section part 42 at its small end, essentially with a circular mating part in 46), capacitive effects tend to be introduced which are compensated for by the inductive post 48. The function of such a structure for the purpose intended will be recognized by those skilled in this art.

Returning now to FIG. 1, it will be realized that a typical linear array, for example, array 11 with its transition 17, has been described. The feedlines 23, 25 and 27 are preferably, although not necessarily, of equal length so that differentials between them do not produce phase differentials among the linear arrays of the group of these arrays which it is intended to control in phase unison. The same may be said of feed lines 24, 26 and 28.

It will be noted that half of the 50 ohm coaxial feed lines (three in the case illustrated) are fed through an impedance matching transformer 29 and the other half through impedance matching transformer 50. These blocks 29 and 50 are effective energy dividers or distributors accounting for the impedance or division mismatching which may arise, considering the specific design and the impedances of lines 30 and 34.

In the system depicted in FIG. 1, a standard pulse radar transmitter 38 and receiver 37 operating through duplexer 36 to provide a receiver output at 39 are shown. The duplexer is connected on the other end by a lead 35 to a junction at which it splits into 33 and 34, the latter going directly to impedance transformer 50 and thence uniformly into lines 24, 26 and 28. The former, namely line 33, is supplied to impedance transformer 29 through a controllable phase shifter 31 and lead 30. The controllable phase shifter 31 may be any of the analog or digital RF or microwave phase shifters known in the art. The so-called Reggia-Spencer phase shifter is a possibility under certain circumstances. Digital-type discrete switching phase shifters using PIN diodes and striplines are another possibility, both of those particular types providing relatively rapid phase change in response to a change of condition of the control signal on 32. The response of the entire system to a phase change here in terms of an operating polarization angle for the planar array 10 is very rapid and fully comparable to the speeds obtained with inertialess scanning systems.

Referring now to FIG. 6, modifications to FIG. 1 are shown and include a variable attenuator 40 which may be inserted in the line 33 between 35 and the phase shifter 31 to introduce a fixed (or variable) attenuation which results in elliptical polarization of the planar array operation, the major-to-minor axis aspect ratio being related to the amount of amplitude differential introduced between the two sets of linear arrays by 40.

From the point of view of utility, planar arrays are normally incorporated into scanning systems. Although not shown, a programmed bank of phase shifters might be introduced in the lines between the planar array (i.e., 23 through 28) and 29 and 50. These then might be programmed to effect electronic scanning in one plane of the planar array 10. The planar array is also adapted for mechanical nod scan or continuous rotational scanning in at least one plane. The person of skill in this art will recognize the possibility for incorporating various other forms of scan into a system incorporating polarization-agile concepts of the present invention; however, since scanning, per se, is not a part of the present invention, these need not be discussed in detail.

It will be particularly noted, that the slot radiators of the alternate arrays are oriented at 45° with respect to the axial or length dimension of the linear arrays, however, they are orthogonal with respect to each other. It might be said that the orientation of the radiators, typically 11b is −45°, whereas that typified by 12b is +45°, or vice versa depending upon the convention adopted.

Through the use of slot radiators in the flat face of the outer rectangular coaxial conductors, according to the invention, interaction among the arrays, such as with mechanical dipole radiators or the like, is greatly minimized. There is essentially no "wrap-around" of the slots as there might be in some slotted array configurations in which the depth of the slot is such as to enter the two normal faces of the outer conductor, as well as the main slot face thereof. In the case of a coaxial line outer conductor 41 not presenting a planar face in the aperture of the array 10, there is inherent interaction which is undesirable if the polarization control concept is to be thoroughly effective as described. The inner and outer conductors of the linear array transmission line bodies 11-16 are constructed of conductive metals or metallic alloys well known for such purposes.

Various modifications will suggest themselves to those skilled in this art once the concepts of the present invention are thoroughly understood. Accordingly, it is not intended that the drawings and this description should be considered as limiting the scope of the inventive concept. The drawings and this description are to be regarded as typical and illustrative only.

What is claimed is:

1. A polarization agile planar antenna array comprising:
   a plurality of first linear arrays of first slot radiators, said first slot radiators being oriented at substantially 45° with respect to the length of said first linear arrays;
   a plurality of second linear arrays of second slot radiators, said second slot radiators being also oriented at substantially 45° with respect to the length dimension of said second linear arrays and substantially 90° with respect to said first slot radiators, said first and second linear arrays being arranged with their length dimensions substantially parallel to form said planar array, said first and second linear arrays being placed alternately;
   a transmit/receive port;
   first means comprising a feed for each of said first linear arrays connected from said transmit/receive port;
   and second means within each of said first and second linear arrays comprising a coaxial dielectrically loaded line having an inner conductor and a hollow rectangular outer conductor, said slots being cut into the walls of said outer conductors;
   and third means comprising a controllable phase shifter and a radio frequency feed therefrom for each of said second linear arrays connected to said transmit/receive port through said phase shifter, the effective operating polarization of said planar array being thereby controlled in response to control of the phase shift provided by said phase shifter in response to a characteristic of an applied control signal.

2. Apparatus according to claim 1 in which means are included for apportioning power at said transmit/receiver port unequally between said first and second arrays to produce said operating polarization as elliptical polarization.

3. Apparatus according to claim 1 in which said inner conductor is of substantially circular cross-section and in which dielectric loading means are provided insulatingly supporting said inner conductor in a substantially coaxial position within said hollow outer conductor.

4. Apparatus according to claim 3 in which said dielectric support means comprises a substantially continuous spiral rod of dielectric material wound about said center conductor with a pitch which is a substantial multiple of the diameter of said rod, said rod having points of tangency with all four inside walls of said outer conductor over said length dimension.

5. Apparatus according to claim 1 in which said first and third means comprise transmission lines connecting from said transmit/receiver port to a feed end of each of said linear arrays on the same side of said planar array, said transmission lines having characteristic impedance less than the characteristic impedance of said second means, and in which an impedance matching section is included within each of said linear arrays near said feed end.

6. Apparatus according to claim 5 in which said impedance matching section comprises a dielectric sleeve about said inner conductor, said sleeve extending for a first predetermined axial length over said inner conductor to an effective electrical length of one quarter wavelength at the operating frequency, the physical parameters of said matching section being such as to produce an effective impedance which is the geometric means of the characteristic impedance of said transmission lines and the remainder of the axial length of said second means.

7. Apparatus according to claim 6 in which lines are conventional coaxial cables substantially of circular cross-section having inner and outer conductors of physical dimensions smaller than said inner and outer conductors of said second means, and in which a tapered transition section is included at each of said second means linear array feed ends to provide gradual change of inner and outer coaxial element cross-sectional dimensions.

8. Apparatus according to claim 7 in which said tapered transition sections are adjacent said feed ends and between said impedance matching sections and said feed ends.

9. Apparatus according to claim 6 in which a conductive post is provided, said post being in close proximity to said feed end within said transition section to introduce an inductance effect to compensate for capacitive effects resulting from transition section geometry.

* * * * *